United States Patent
Burgard et al.

[11] Patent Number: 6,123,363
[45] Date of Patent: Sep. 26, 2000

[54] SELF-CENTERING LOW PROFILE CONNECTION WITH TRAPPED GASKET

[75] Inventors: Jeffrey E. Burgard, Lombard; Gary A. Schulz, Mt. Prospect, both of Ill.

[73] Assignee: UOP LLC, Des Plaines, Ill.

[21] Appl. No.: 09/184,373

[22] Filed: Nov. 2, 1998

[51] Int. Cl.[7] .................................................. F16L 35/00
[52] U.S. Cl. ............................ 285/24; 285/39; 285/90; 285/331; 285/349; 285/364; 285/373
[58] Field of Search ................................ 285/24, 27, 349, 285/39, 331, 90, 354, 373, 364

[56] References Cited

U.S. PATENT DOCUMENTS

| | | | |
|---|---|---|---|
| 648,232 | 4/1900 | Brandt | 285/331 |
| 1,638,224 | 8/1927 | Vandergrift | 285/331 X |
| 3,542,381 | 11/1970 | Hait | 285/349 X |
| 4,134,605 | 1/1979 | Giihne | 285/24 X |
| 4,159,132 | 6/1979 | Hitz | 285/39 |
| 5,131,632 | 7/1992 | Olson | 285/382 |
| 5,152,556 | 10/1992 | Holland et al. | 285/353 |
| 5,265,917 | 11/1993 | Hitz | 285/86 |
| 5,553,902 | 9/1996 | Powers | 285/354 X |
| 5,782,500 | 7/1998 | Mate | 285/24 |

FOREIGN PATENT DOCUMENTS 1210425  of 0000  France .

*Primary Examiner*—Dave W. Arola
*Attorney, Agent, or Firm*—John G. Tolomei

[57] ABSTRACT

The assembly of a connection that uses cooperating grooved surfaces to provide an easily disassembled and assembled connection is improved by the use of a centered lip and cooperating groove on the contact faces of the connection halves that engage the faces of complementary connection ends to prevent lateral misalignment while the pipe ends are brought together for axial alignment. The lip extends into the groove to trap a gasket retained within the groove and inhibit extrusion of the gasket between the contact faces under high pressure conditions. The centering device may be used with a clamping mechanism to provide single person assembly of this type of connection despite normal field misalignments. The trapping cavity formed by the faces of the connection ends particularly enhances the pressure capacity of elastomeric gasket applications.

5 Claims, 3 Drawing Sheets

SELF-CENTERING LOW PROFILE CONNECTION WITH TRAPPED GASKET

BACKGROUND OF THE INVENTION

This invention relates generally to the connection of conduits with connectors that are readily coupled and uncoupled in conduit systems.

BACKGROUND OF THE INVENTION

Connectors for conduits such as piping systems where the pipes are not suitable for use with screwed connections are well known. One of the most common forms of such connection is the well known flange connection having bolts for assembly and disassembly of the connection. Another well known type of connection uses a series of machined grooves on the ends of pipes that are connected by bridging links that have complementary grooves for engaging the grooves on the pipe ends. A sleeve or other retaining means is used to hold the link members against the pipes and the cooperating grooves in engagement. Different forms of these types of connections can be seen in U.S. Pat. Nos. 5,152,556; 5,265,917; 5,131,632 and 4,159,132.

Alignment of bolted flanges has been provided in a number of ways. The most basic way to align bolted flanges is by the use of the bolts and the tightening sequence to simultaneously draw the flange halves together and align the centerlines of both flanges.

One difficulty associated with groove and link type connections has been in their field assembly. The ends of pipes to be connected often extend from equipment and or piping arrangement that do not provide perfect alignment for engagement of the links in the grooves of the pipe ends. In the assembly of these connections, the pipe ends must be almost perfectly aligned in the radial or the axial direction for the retaining links to be applied to the outside of the pipe ends. The ends must be maintained in near-perfect alignment and the links held in place while an attachment sleeve is slid over the links to retain them in place. The assembly of these groove type connections can create problems in field assembly due to the difficulty of maintaining the alignment of the center line of the connection ends while the linking members are put in place and the annular ring or other retaining device secures the locking of the linking members in place. The problem is exacerbated due to the fact that the faces of both connection ends are perfectly smooth for most commonly used gasket styles. This allows them to easily slide out of alignment relative to each other with little or no external force supplied. This leads to a difficult and inefficient assembly that requires one or two persons to manually maintain the alignment of the pipe ends while another person attaches the link members and the tapered ring that holds them in place.

Previously mentioned U.S. Pat. No. 4,159,132 issued to G. L. Hitz teaches the use of a clamping method to draw both halves of the pipe ends into place about their contact faces. The clamping mechanism however does not provide the necessary lateral alignment and stability for the two halves during assembly of the links and locking of the retaining means on the links.

It has also been found that the traditional o-ring retaining groove does not adequately protect o-rings during alignment procedures. The dragging of one connection face across the other in a braid or otherwise will damage the o-ring even when it is retained in a groove. Once damaged the o-ring will fail to provide an adequate fluid seal.

Apart from assembly and damage problems, the arrangement of the connector face can affect the pressure retaining capacity of the gasket. For example, a traditional design for elastomeric o-ring employs a groove for retaining the o-ring in position against sealing surface. Pressure acting on the elastomeric o-rings initially assists providing their fluid sealing capacity. However the pressure can eventually reach a level that deforms the o-ring to a point where the seal is compromised.

SUMMARY OF THE INVENTION

An object of this invention is to facilitate the installation of grooved and link-type connections.

It is also an object of this invention to increase the ability of the gaskets in grooved and link-type connections to withstand pressure.

This invention is the addition of integral and complementary structures on the face of the pipe connections that self-align the connection halves and retain a gasket while obstructing the seam between the pipe connection faces with a labyrinth path that interrupts any direct radial flow path for potential leakage and protects the gasket from potential leakage. A complementary groove and annulus, typically in the form of a square lip, form the labyrinth path. The labyrinth path inhibits extrusion of a trapped gasket under pressure which increases the fluid pressure resistance of the gasket seal. The lip extends into the groove to place a desired axial sealing pressure on the gasket. Extension of the lip into the groove drops the gasket in its entirety below the contact faces of the connector. This arrangement fully supports the back of the gasket, i.e. the side of the gasket opposite the applied pressure. As a result gasket extrusion can only occur in a direction that is substantially transverse to the principal direction of the applied pressure. As an additional benefit, dropping the gasket below the face of the contact surfaces protects the gasket from damage during alignment of the two connection halves. With the gasket thus protected from damage, the lip and groove fulfill the additional objective of providing an integral self-centering structure.

The connection provided by the invention can be practiced with or without the use of a clamping means. The conduit ends are brought into alignment until the lip and the mating groove cooperate to prevent radial misalignment of the conduit ends. The lip and centering surface will then maintain the radial alignment of the two ends once the conduit ends are brought together and aligned axially. The only force that may be necessary to be applied to the conduits will maintain the axial alignment of the conduits so that the two ends remain in close proximity and the lip and groove surface remain engaged. An additional clamping means may be utilized to provide any necessary force to keep the connector faces of the conduit ends sufficiently close together such that the lip and groove remain engaged during placement of the links and addition of the retaining means. Thus, as long as axial alignment is maintained there is no need to apply any force to maintain lateral or radial alignment of the ends. Accordingly, the link members will not be displaced from engagement with the lip and groove on opposite conduit ends before the retaining sleeve can be placed over the links.

Whether the lip and complementary groove have a square profile or some other geometry will depend on the gasket type and the particular application of the connector. Portions of the groove or lip may have angled or tapered edges to facilitate the centering function of the lip and groove combination. However, a square lip and groove profile are generally preferred for ease of machining and for providing the most effective support of the gasket to prevent its extrusion under high pressure.

Highly plastic or elastic materials that are readily deformed under pressure will benefit when used in the connector arrangement of this invention. This invention is most advantageously used with well known elastomeric o-rings. The particular material of the preferred o-rings will vary depending on the particular connector application. Appropriate materials for the o-rings to suit particular process conditions and fluid environments are readily determined by those skilled in the art. While o-rings may represent the most common type of gasket for use in this connector arrangement, other gasket materials and profiles may be advantageously used for this particular type of connector. The profile of the gasket may have any geometry which can be retained in the connector groove. Other than the round profile, the gaskets with flat or square profiles will usually provide the most common alternative.

The geometry of the lip and groove is determined by the requirements for establishing the gasket seal and for providing the centering function. The groove should have sufficient depth to protect the gasket from contact with the edges of the mating connector face during the assembly operation. In the case of a square groove that snuggly retains an o-ring between its sidewalls, the depth of the groove will ordinarily equal about 120 to 125% of its width. Therefore, an annular lip will usually extend from the contact face of the male connector by a distance equal to at least 20% of the group depth. The necessary depth of the groove to protect the gasket from contact with the connector face during assembly will increase as the width of the groove increases. The lip projection must also be set to provide adequate sealing pressure to the surface of the gasket. Ordinarily the groove and lip are centered over the annular area of the contact faces.

Accordingly, in a specific embodiment, this invention is a connection for joining conduits in a piping arrangement. A male connection half defines an external contact surface extending at least intermittently around the periphery of the connection half in a transverse direction and a male connector face at one end of the first connection half. The external contact surface faces away from the connector face and extends from the outer surface of the connector half at an angle of at least 90° with respect to the axis of the connection to define a perpendicular or a ramped surface. An annular lip rises from a central portion of the male connector face and continuously traverses the circumference of the male connector face. A female connection half having essentially the same configuration as the first connection half except for the connector face is also used in the connection. The female connector half defines a circular groove in its central portion that continuously traverses the circumference of the male connector face to retain a gasket and receive at least a portion of the annulus. At least two links are adapted such that each extends partially around the outside of the connection halves about the central axis of the connection. Each link has a pair of longitudinally-spaced-apart contact surfaces that extend at least partially around the interior of each link in a transverse direction. Contact surfaces of the links engage the external contact surfaces on the connection halves. A locking member extends at least partially around and in engagement with the links to secure the spaced-apart contact surfaces of the links into engagement with the external contact surfaces of the connection halves.

Other objects, embodiments and details of this invention can be more fully understood from the following detailed description of the drawings.

DETAILED DESCRIPTION OF THE DRAWINGS

Figure 1:
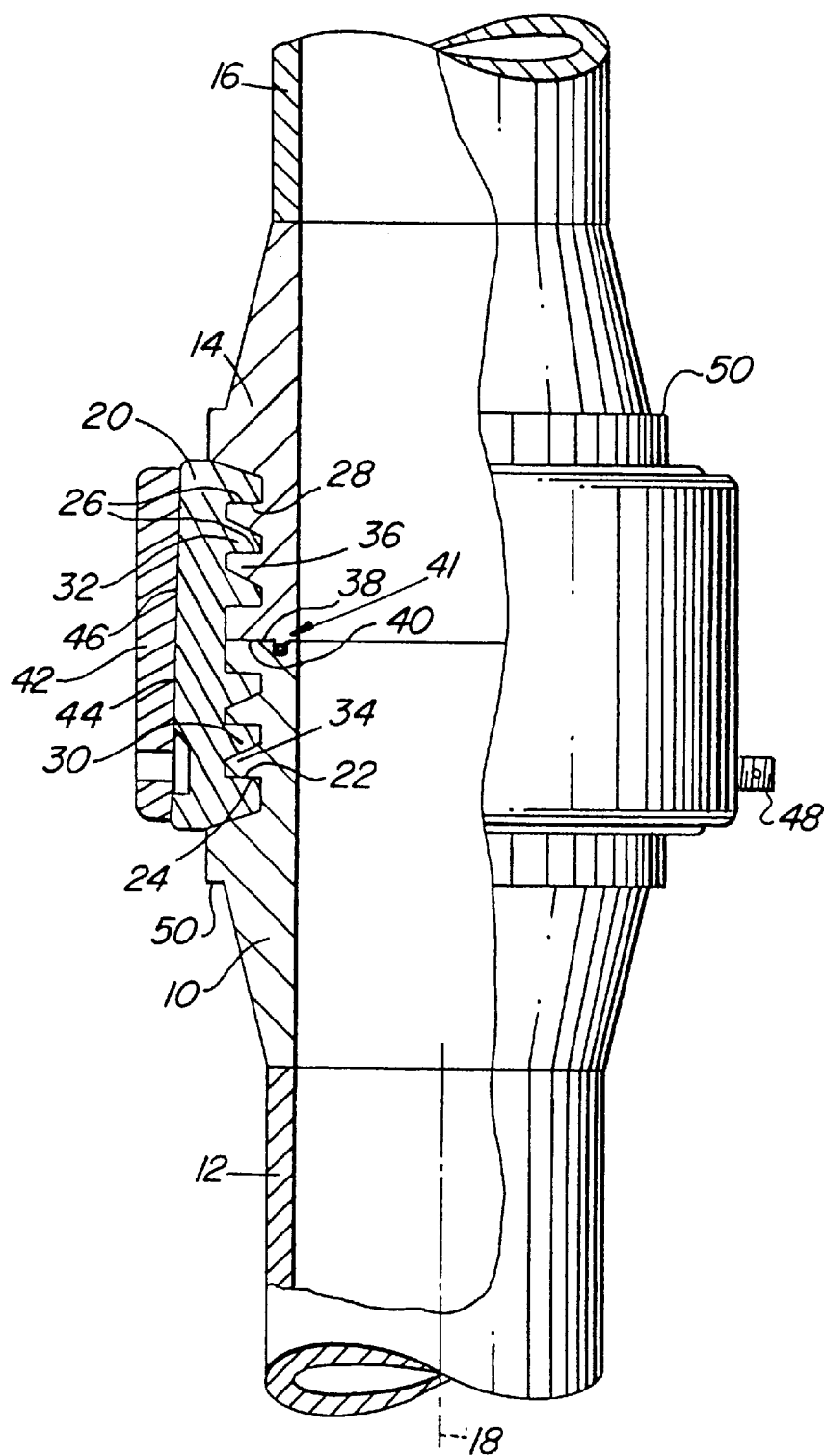
FIG. 1 is a partial section of the connector arrangement of this invention.

FIG. 1 shows the connection of this invention having a male connection half 10 joined to a pipe end 12 and a female connection half 14 joined to a pipe end 16. A male connection half having connection halves 10 and 14 will usually have a cylindrical shape and be located at the end of pipes, in pressure vessels or on blind flange members. Pipe sections 10 and 12 are located about a common axis 18. Each connection half 10, 14 also defines a shoulder 50 for engagement with a suitable device, such as a clamp, to provide an axial force and aligning movement to the connection halves during assembly.

At least two semi-cylindrical links 20 having contact surfaces 24 and 26 engage contact surfaces 22 and 28 on connector halves 10 and 14, respectively. A series of grooves defined by transversely extended ribs 30 and 32 on link 20 define the contact surfaces 26 and 24 respectively. Similarly transversely extended ribs 34 and 36 on connector halves 10 and 14 define contact surfaces 22 and 28. The contact surfaces may extend all the way around pipe ends and over the entire transverse length of the link or may be formed as intermediate sections of contact surfaces over only a portion of the transverse length of the links and the connector halves. Contact surfaces 22 and 24, and contact surfaces 26 and 28 may extend perpendicularly from the link or connector halves to or may have a small taper to urge connector faces 38 and 40 toward teach other. Together contact faces 40 and 38 define a lip and groove structure 41.

Links 20 are held in place by an annular sleeve 42 that has a sloped surface 44 for engagement with a complementary sloped surface 46 on the outside of the links 20. A set screw 48 or other similar attachment device may be used to keep sleeve 42 in place over links 20. The types of retaining devices are not limited to structures such as sleeve 42. Any suitable retaining structure or mechanism could be used such as a clamp arrangement.

Figure 2:
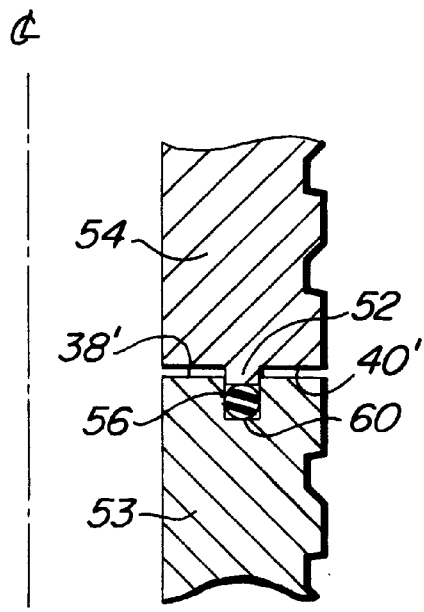
FIG. 2 is a lip and complementary groove portion of the connection halves.

FIG. 2 shows an enlarged detail of a lip and groove for a pair of connector ends. A square lip 52 extends outwardly from a contact face 40' of a male connector end 54. An opposing connector face 38' of a female connector half 53 has an internal groove 56 aligned to receive lip 52 and to center connector halves 54 and 53. An o-ring gasket 60 rests on the bottom of groove 56. The square lip and groove arrangement shown in FIG. 2 has the advantage of providing a compact design and of establishing excellent alignment with simple machining.

Figure 3:
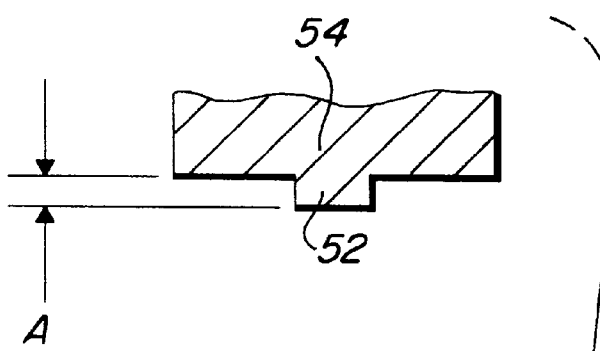
FIG. 3 is an enlarged section of FIG. 2.
Figure 3:
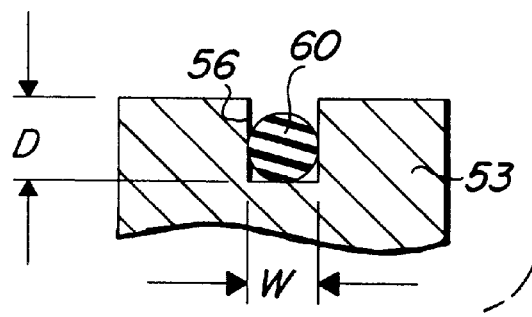

As detailed by the further enlargement of FIG. 3, the lip 52 extends outward by a distance A. Typically, projection A need not be large but should be sufficient to prevent slight separation between the connection halves from allowing the pipe ends to spring away from lateral alignment during assembly of the connection and for smaller connectors will normally be in a range of about 0.025" to 0.125". Lip 52 has a width that is slightly exceeded by the width W of the cooperating groove 56 defined in connector end 53. Width W of the groove is sized to receive O-ring 60 and may be larger or slightly smaller than the diameter of the O-ring but is usually about equal to the O-ring diameter. The depth D of the groove will ordinarily equal the diameter of the O-ring plus the projection A of the lip minus any distance by which it is desired to initially compress the O-ring.

Figure 4:
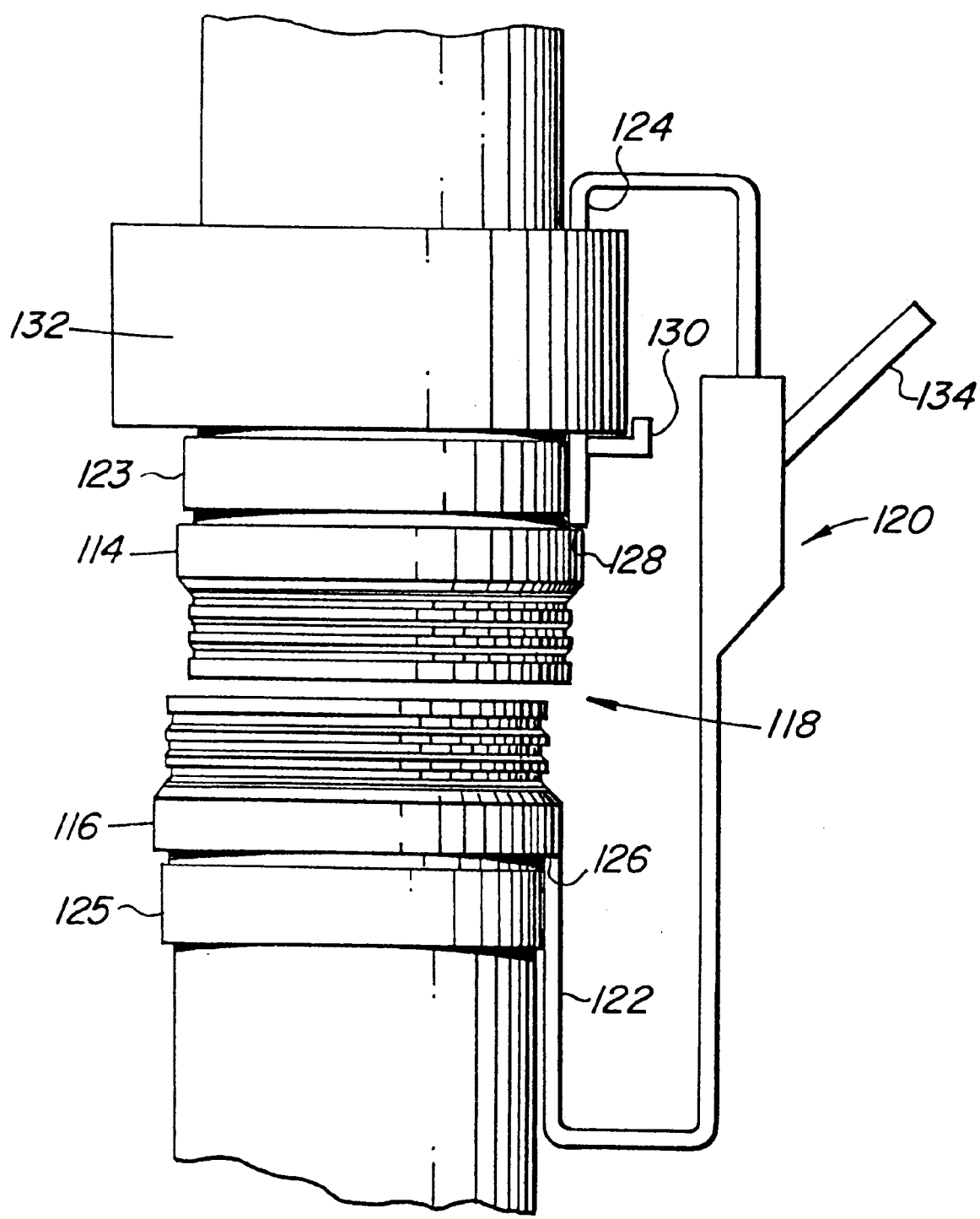
FIG. 4 shows a clamping arrangement for use with this invention.

FIG. 4 shows a suitable device for assembling two pipe ends by the method of this invention. By this method, pipe ends 114 and 116 will be provided generally at reference area 118 with suitable portions of a lip and centering surface the same or similar to those shown in FIG. 2. The procedure uses a clamping device 120. The clamping arrangement has extended legs 122 and 124 with ends that contact shoulders 126 and 128, respectively. Circumferential straps 123 and 125 may be provided to hold leg 122 and 124 in place during assembly. Either or both of leg 122 and 124 may be provided with a place for a retaining bracket 130 for holding annular sleeve 132 away from pipe ends 114 and 116 as the clamp is being used to align the pipe end. The extended length of leg 122 and 124 provide enough space for the pipe sleeve to be positioned out of the way of the connection as the links of the connection (not shown) are being applied to the pipe ends.

The procedure begins by laterally aligning the pipe ends 114 and 116 while clamp 120 pulls pipe ends 114 and 116 together by closing the clamp through movement of lever 134. Once the pipe ends are brought into engagement with the centering device, continued movement on lever 134 may bring the ends of connector halves 114 and 116 together for installation of the connector links (not shown). Once connector halves 114 and 116 have been brought together and the lip and groove are engaged, no further lateral restraint of the pipe ends is necessary. Therefore, the link members may be installed across the connector halves without any concern of pipe spring laterally displacing the links before sleeve 132 may be brought into position for retaining the links. Once sleeve 132 has been positioned to hold the links in place, clamp 120 may be retracted and the assembly is complete.

What is claimed is:

1. A pipe connection for joining pipe ends, said connection comprising:

a lipped pipe end having a lipped connection face at its distal end and defining a first plurality of spaced apart grooves each defining flats encircling the outside of the pipe end;

a grooved pipe end having a grooved connection face at its distal end and defining a second plurality of spaced apart grooves each defining flats encircling the outside of the second pipe end;

an annular lip extending outwardly from and centered about said lipped connection face, said lip extending from said lipped connection face by a distance equal to at least 20% of the depth of a complementary recess that receives at least a portion of said lip;

an annular groove defined by and centered about the grooved connection face to retain a gasket and to provide said complementary recess for receiving at least an outer portion of the annular lip for aligning engagement with said lip as said lipped and grooved connection faces are urged toward each other;

at least two semi-cylindrical links adapted to together substantially encircle said lipped and grooved pipe ends, each link defining two longitudinally spaced apart groups of grooves each group of grooves defining flats for engaging the flats in one of said first and second plurality of grooves and each link having a ramped outer surface; and, an annular sleeve having an internal sloped surface for encircling said links and retaining said links in contact with said pipe ends.

2. The connection of claim 1 wherein said flats are ramped to urge said connection faces toward each other as said ring engages said links.

3. The connection of claim 2 wherein said links hold said lipped and grooved connection faces in sealing contact to provide a sealed connection.

4. The connection of claim 1 wherein the lip and the groove have square profiles.

5. The connection of claim 1 wherein said gasket comprises an elastomeric O-ring.

* * * * *